(12) United States Patent
Benco et al.

(10) Patent No.: US 7,706,803 B2
(45) Date of Patent: Apr. 27, 2010

(54) NETWORK SUPPORT FOR RF BACKHAUL FOR VERY REMOTE BASE STATIONS

(75) Inventors: David S. Benco, Winfield, IL (US); Sanjeev Mahajan, Naperville, IL (US); Baoling S. Sheen, Naperville, IL (US); Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 14 days.

(21) Appl. No.: 11/172,546

(22) Filed: Jun. 30, 2005

(65) Prior Publication Data

US 2007/0004418 A1 Jan. 4, 2007

(51) Int. Cl.
*H04B 7/216* (2006.01)

(52) U.S. Cl. .................. 455/445; 455/440; 370/331

(58) Field of Classification Search .............. 455/435.1, 455/448, 440, 445, 561, 432.1, 41.2, 436, 455/452.2, 428; 370/338, 331
See application file for complete search history.

(56) References Cited

U.S. PATENT DOCUMENTS

| | | | | |
|---|---|---|---|---|
| 5,203,010 A | * | 4/1993 | Felix et al. | 455/438 |
| 5,974,325 A | * | 10/1999 | Kotzin et al. | 455/450 |
| 6,339,694 B1 | * | 1/2002 | Komara et al. | 455/11.1 |
| 6,370,185 B1 | * | 4/2002 | Schmutz et al. | 375/214 |
| 6,442,389 B1 | * | 8/2002 | Marcum | 455/437 |
| 6,778,517 B1 | * | 8/2004 | Lou et al. | 370/338 |
| 7,092,714 B2 | * | 8/2006 | Noll et al. | 455/446 |
| 7,292,560 B2 | * | 11/2007 | Lou et al. | 370/338 |
| 2004/0179555 A1 | * | 9/2004 | Smith | 370/521 |
| 2004/0213188 A1 | * | 10/2004 | Struhsaker et al. | 370/336 |
| 2006/0083186 A1 | * | 4/2006 | Handforth et al. | 370/310 |
| 2006/0135173 A1 | * | 6/2006 | Vannithamby | 455/453 |
| 2006/0268689 A1 | * | 11/2006 | Tarraf et al. | 370/229 |

* cited by examiner

*Primary Examiner*—George Eng
*Assistant Examiner*—Brandon J Miller
(74) *Attorney, Agent, or Firm*—Carmen Patti Law Group, LLC

(57) ABSTRACT

An apparatus in one example has: an RF-based base station in a telecommunications network; the RF-based base station having a base station transceiver; the telecommunications network having a network transceiver; and the base station transceiver and the network transceiver being structured for backhaul traffic and signaling for incoming and outgoing mobile calls to a mobile terminal that is operatively coupled to the base station.

12 Claims, 2 Drawing Sheets with a base station transceiver; equipping the telecommunications network with a network transceiver; and using the base station transceiver and the network transceiver for backhaul traffic and signaling for incoming and outgoing mobile calls to a mobile terminal that is operatively coupled to the base station. When the mobile terminal roams away from RF-based backhaul cell(s) zone boundaries, the method may detect, via the network, entry of the mobile terminal into a new zone and transitioning a mobile call from an RF-based backhaul to a wire-based backhaul. If the mobile terminal is engaged in a call during transitioning of the mobile call from an RF-based backhaul to a wire-base backhaul, one of a hard handoff and a soft handoff for the transition is used. If the mobile terminal is not engaged in a call, but is powered up, during transitioning of the mobile call from an RF-based backhaul to a wire-base backhaul, a registration message that is sent to the network by the mobile phone for the transition is used. If the mobile terminal is not powered up, then no action is taken.

NETWORK SUPPORT FOR RF BACKHAUL FOR VERY REMOTE BASE STATIONS

TECHNICAL FIELD

The invention relates generally to telecommunications networks, and more particularly to a telecommunications network that provides remote base station capability by utilizing a radio frequency (i.e., wireless) backhaul.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has a number of important features. Nearly all wireless phones incorporate at least a keyboard for entering numbers and text, and a display that allows the user to display text, dialed numbers, pictures and incoming caller numbers. Additionally, wireless phones may incorporate electronic phonebooks, speed dialing, single button voicemail access, and messaging capabilities, such as e-mail.

Subscribers' reliance upon their mobile terminals (such as, cell phones) and on wireless service in general continues to increase. The demand for and implementation of Emergency-911 and geo-location services for mobile terminals are two typical examples of this increasing demand. However, subscribers quickly learn that, once away from areas equipped with cells and base stations, their mobile terminals are no longer able to function. This lack of connectivity is a significant drawback of the prior art.

SUMMARY

The invention in one implementation encompasses an apparatus. The apparatus may comprise: an RF-based base station in a telecommunications network; the RF-based base station having a base station transceiver; the telecommunications network having a network transceiver; and the base station transceiver and the network transceiver being structured for backhaul traffic and signaling for incoming and outgoing mobile calls to a mobile terminal that is operatively coupled to the base station.

The invention in another implementation encompasses a method. This embodiment of the method may comprise: using a radio frequency backhaul rather than a wireline-based backhaul for handling a mobile call between a mobile terminal and a telecommunications network.

Another implementation of the invention encompasses a method. This embodiment method may comprise: defining a base station as a RF-based base station in a telecommunications network; equipping at least the RF-based base station

DESCRIPTION OF THE DRAWINGS

Features of exemplary implementations of the invention will become apparent from the description, the claims, and the accompanying drawings in which:

DETAILED DESCRIPTION

Well-executed backhaul is arguably the most essential element to a successful fixed wireless deployment. Picking the right backhaul gear depends on the application the operator is trying to achieve, as well as the distance covered by the link. Equipment vendors vary in their approaches to providing backhaul solutions. Some focus on supplying backhaul solutions that operate solely in the unlicensed frequency bands. Other equipment vendors offer a mix of products for both the licensed and unlicensed bands. For example, the unlicensed 5.8 GHz band is often used for backhaul operations, as it is presently far less crowded than the 2.4 GHz unlicensed band. Using unlicensed radio links for backhaul operations implies a certain degree of risk due to the possibility of interference.

Core backhaul typically refers to metropolitan or tier-1 city deployments, where high bandwidth and reliability requirements are paramount. Links are often only a couple of miles long and need to be free from interference. Middle and long-range backhaul extends networks farther than a two-mile range, and up to 30 miles or more in some cases. However, all of these solutions cannot provide for very long distance communication for cell phones.

Embodiments of the present apparatus and method remedy the above shortcoming of mobile terminal coverage by utilizing a new type of base station and RF (radio frequency)-backhaul to enable mobile phone usage in remote areas, even on the high seas. The present embodiments remove the large physical distance between the cell phone and the mobile switching center as an obstacle to mobile communications. The normal wired connections between the base station and the network may be replaced by a radio link and two transceivers.

Methodologies of the present apparatus and method involve a telecommunications network that provides remote base station capability by utilizing a radio frequency (i.e., wireless) backhaul rather than the known wireline-based backhaul schemes (e.g., Ti-based, IP-based, etc.).

Further methodologies according to the present apparatus and method include: providing satisfactory remote area wireless coverage to mobile subscribers; providing for base stations to transmit and receive backhaul traffic and signaling information over a radio link vs. a physical link; and providing for the network to transmit and receive backhaul traffic and signaling information over a radio link vs. a physical link.

Figure 1:
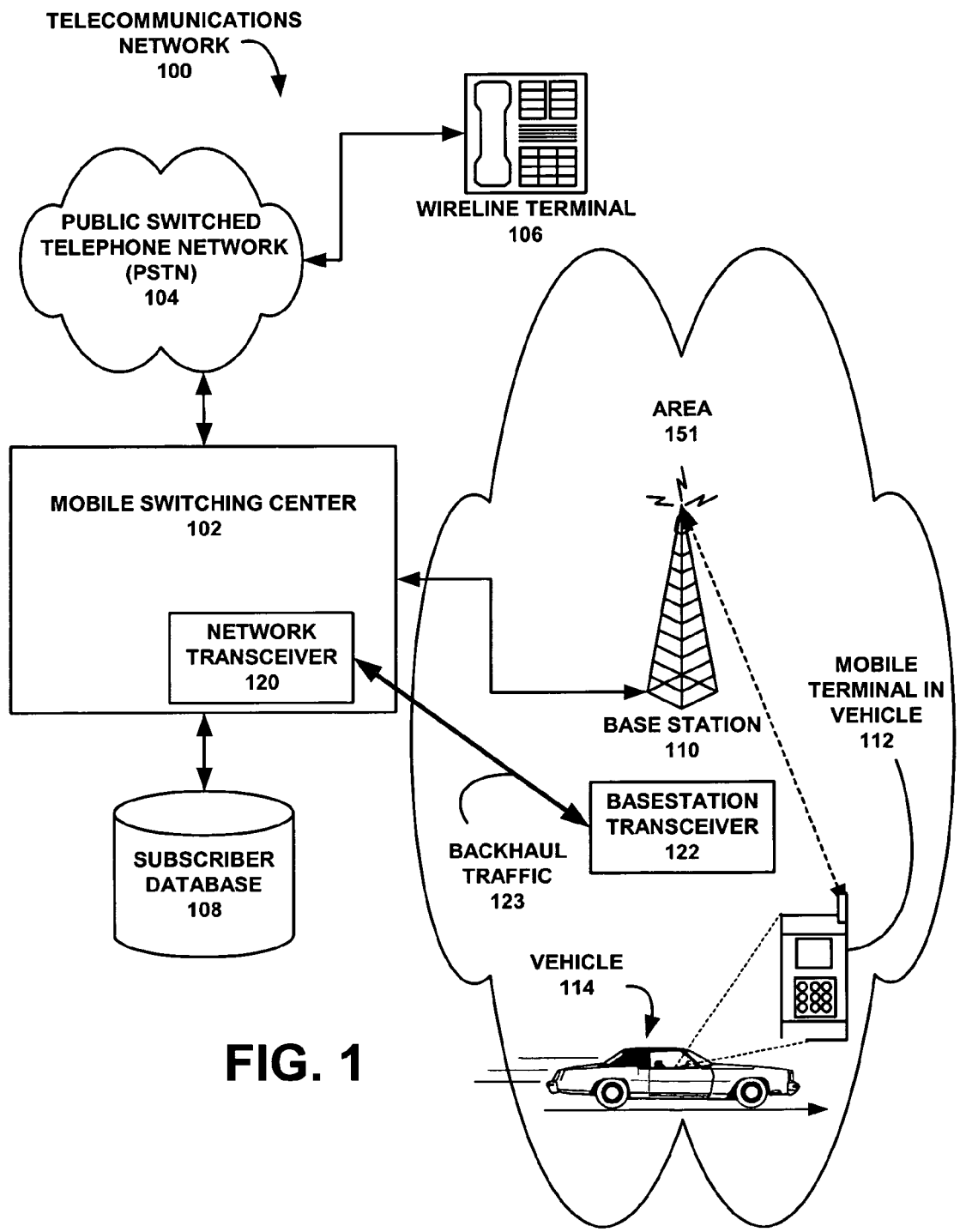
FIG. 1 is a representation of one implementation of an apparatus in which a telecommunications network provides remote base station capability by utilizing a radio frequency (i.e., wireless) backhaul rather than the known wireline-based backhaul schemes (e.g., T1-based, IP-based, etc.)

FIG. 1 is a representation of one implementation of an apparatus in which a telecommunications network provides remote base station capability by utilizing a radio frequency (i.e., wireless) backhaul rather than the known wireline-based backhaul schemes (e.g., T1-based, IP-based, etc.).

A telecommunications network 100 may have a mobile switching center 102. The network 100 may be, or may be part of, one or more of a telephone network, a local area network ("LAN"), the Internet, and a wireless network. In the depicted embodiment, a public switched telephone network (PSTN) 104 may be connected to the mobile switching center 102. The PSTN 104 may, for example, route calls to and from a mobile terminal 112 through the mobile switching center 102, and to a wireline terminal 106. The mobile switching center 102 may also be connected to at least one base station 110. The base station 110 may communicate with the mobile terminal 112 in its service area 151 using a subscriber database 108.

The PSTN 104 generally may be implemented as the worldwide voice telephone network accessible to all those with telephones and access privileges (e.g., AT&T long distance network). The mobile terminal 112 may be any one of a number of devices, such as a cell phone, a personal data assistant (PDA), a laptop computer, etc.

According to embodiments of the present method and apparatus, the mobile switching center 102 may have a network transceiver 120 that is operatively coupled by an RF (radio frequency) link to a base station transceiver 122 in the base station 110. When the mobile terminal 112 is, for example, being carried in a vehicle 114 that is currently located in an area 151 wherein the base station 110 is at such a great physical distance from the network 100 that normally there would be no cellular service to the network 100, the mobile terminal 112 is still able to communicate with the network 100. This is possible due to the RF backhaul link 123 between the network transceiver 120 and the base station transceiver 122. Since the backhaul link 123 is RF, cell phones are now able to connect to telecommunications networks, even when, for example, the cell phone is with a subscriber who is on a cruise ship sailing an ocean.

Embodiments of the present apparatus and method may be implemented in general terms and operated as follows. A service provider may define a base station as a remote (or RF-based) base station. Either fully-equipped base stations or lesser-coverage cells (e.g., microcells would suffice for a cruise ship) may be equipped with an RF (radio frequency) transceiver interface to the backhaul traffic and signaling. Any incoming or outgoing calls to the mobile terminal may then utilize the RF backhaul rather than a wire-based backhaul. When the subscriber roams away from the RF-based backhaul cell(s) zone boundaries, the network detects the entry into a new zone and the mobile call is transitioned to a wire-base backhaul. If the mobile terminal is engaged in a call, this is accomplished via either a hard handoff or a soft handoff. If the mobile terminal is not engaged in a call, but is powered up, a registration message is sent to the network by the mobile phone.

Figure 2:
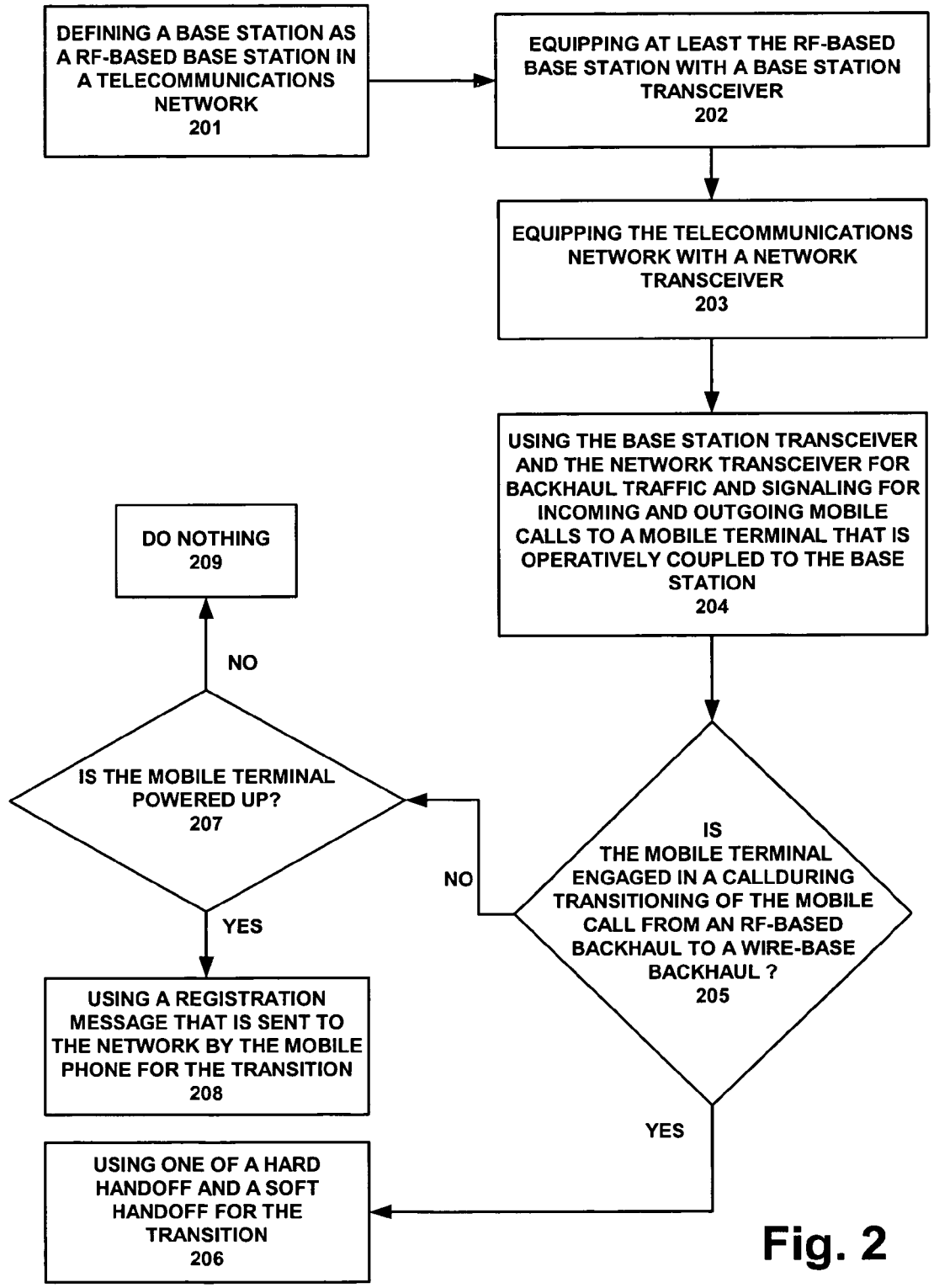
FIG. 2 is a representation of one exemplary flow diagram for providing remote base station capability by utilizing a radio frequency backhaul.

FIG. 2 is a representation of one exemplary flow diagram of the present method. This method may have the steps of: defining a base station as a RF-based base station in a telecommunications network (201); equipping at least the RF-based base station with a base station transceiver (202); equipping the telecommunications network with a network transceiver (203); and using the base station transceiver and the network transceiver for backhaul traffic and signaling for incoming and outgoing mobile calls to a mobile terminal that is operatively coupled to the base station (204). When the mobile terminal roams away from RF-based backhaul cell(s) zone boundaries, the method may detect, via the network, entry of the mobile terminal into a new zone and transition a mobile call from an RF-based backhaul to a wire-based backhaul. If the mobile terminal is engaged in a call during transitioning of the mobile call from an RF-based backhaul to a wire-base backhaul (205), one of a hard handoff and a soft handoff for the transition is used (206). If the mobile terminal is not engaged in a call, but is powered up (207), during transitioning of the mobile call from an RF-based backhaul to a wire-base backhaul, a registration message that is sent to the network by the mobile phone for the transition is used (208). If the mobile terminal is not powered up, then no action is taken (209).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. Examples of a computer-readable signal-bearing medium for the apparatus 100 may comprise the recordable data storage medium (subscriber database 108). The computer-readable signal-bearing medium for the apparatus 100 in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for establishing communication between a mobile terminal and a telecommunications network, comprising:

using a radio frequency (RF) backhaul in place of a wireline-based backhaul for handling a mobile call between the mobile terminal and the telecommunications network when distance or conditions render the use of wireline-based backhaul impossible;

defining a base station as a RF-based base station in the telecommunications network;

equipping at least the RF-based base station with a base station transceiver;

equipping the telecommunications network with a network transceiver;

using the base station transceiver and the network transceiver for backhaul traffic and signaling for incoming and outgoing mobile calls to the mobile terminal that is operatively coupled to the base station; and when the mobile terminal roams away from RF-based backhaul cell(s) zone boundaries, detecting, via the network, entry of the mobile terminal into a new zone and transitioning a mobile call from an RF-based backhaul to a wire-base backhaul;

wherein the base station transceiver and the network transceiver are structured for backhaul traffic and signaling for incoming and outgoing mobile calls to the mobile terminal that is operatively coupled to the base station when distance or conditions render the use of wireline-based backhaul impossible;

wherein, when the mobile terminal is located in an area where the base station is at a physical distance from the network such that there is no cellular service to the network, the mobile terminal is still able to communicate with the network due to an RF backhaul link between the network transceiver in the network and the base station transceiver in the base station;

wherein the RF-based base station with the base station transceiver has at least one cell in which is located the mobile terminal, and wherein the RF-based base station, the mobile terminal, and the at least one cell are located at the physical distance from the network such that there is no cellular service to the network.

2. The method according to claim 1, wherein, if the mobile terminal is engaged in a call during transitioning of the mobile call from an RF-based backhaul to a wire-base backhaul, using one of a hard handoff and a soft handoff for the transition.

3. The method according to claim 1, wherein, if the mobile terminal is not engaged in a call, but is powered up, during transitioning of the mobile call from an RF-based backhaul to a wire-base backhaul, using a registration message that is sent to the network by the mobile phone for the transition.

4. A method for establishing communication between a mobile terminal and a telecommunications network, comprising:

defining a base station as a radio frequency (RF) based (RF-based) base station in the telecommunications network;

equipping at least the RF-based base station with a base station transceiver;

equipping the telecommunications network with a network transceiver;

using the base station transceiver and the network transceiver for backhaul traffic and signaling for incoming and outgoing mobile calls to the mobile terminal that is operatively coupled to the base station when distance or conditions render the use of a wireline-based backhaul impossible; and when the mobile terminal roams away from RF-based backhaul cell(s) zone boundaries, detecting, via the network, entry of the mobile terminal into a new zone and transitioning a mobile call from an RF-based backhaul to a wire-base backhaul;

wherein the base station transceiver and the network transceiver are structured for backhaul traffic and signaling for incoming and outgoing mobile calls to the mobile terminal that is operatively coupled to the base station when distance or conditions render the use of wireline-based backhaul impossible;

wherein, when the mobile terminal is located in an area where the base station is at a physical distance from the network such that there is no cellular service to the network, the mobile terminal is still able to communicate with the network due to an RF backhaul link between the network transceiver in the network and the base station transceiver in the base station;

wherein the RF-based base station with the base station transceiver has at least one cell in which is located the mobile terminal, and wherein the RF-based base station, the mobile terminal, and the at least one cell are located at the physical distance from the network such that there is no cellular service to the network.

5. The method according to claim 4, wherein, if the mobile terminal is engaged in a call during transitioning of the mobile call from an RF-based backhaul to a wire-base backhaul, using one of a hard handoff and a soft handoff for the transition.

6. The method according to claim 4, wherein, if the mobile terminal is not engaged in a call, but is powered up, during transitioning of the mobile call from an RF-based backhaul to a wire-base backhaul, using a registration message that is sent to the network by the mobile phone for the transition.

7. An apparatus for use in establishing communication between a mobile terminal and a telecommunications network, comprising:

a radio frequency (RF) based (RF-based) base station in the telecommunications network;

the RF-based base station having a base station transceiver;

the telecommunications network having a network transceiver;

the base station transceiver and the network transceiver being structured for backhaul traffic and signaling for incoming and outgoing mobile calls to the mobile terminal that is operatively coupled to the base station when distance or conditions render the use of wireline-based backhaul impossible; and when the mobile terminal roams away from RF-based backhaul cell(s) zone boundaries, the network is structured to detect entry of the mobile terminal into a new zone and to transition a mobile call from an RF-based backhaul to a wire-base backhaul;

wherein, when the mobile terminal is located in an area where the base station is at a physical distance from the network such that there is no cellular service to the network, the mobile terminal is still able to communicate with the network due to an RF backhaul link between the network transceiver in the network and the base station transceiver in the base station;

wherein the RF-based base station with the base station transceiver has at least one cell in which is located the mobile terminal, and wherein the RF-based base station, the mobile terminal, and the at least one cell are located at the physical distance from the network such that there is no cellular service to the network.

8. The apparatus according to claim 7, wherein, if the mobile terminal is engaged in a call during transitioning of the mobile call from an RF-based backhaul to a wire-base backhaul, the network is structure to use one of a hard handoff and a soft handoff for the transition.

9. The apparatus according to claim 7, wherein, if the mobile terminal is not engaged in a call, but is powered up, during transitioning of the mobile call from an RF-based backhaul to a wire-base backhaul, the network is structured to use a registration message that is sent to the network by the mobile phone for the transition.

10. An apparatus for use in establishing communication between a mobile terminal and a telecommunications network, comprising:
- a plurality of base stations in the telecommunications network, at least one of the base stations being a radio frequency (RF) based (RF-based) base station, the RF-based base station located remotely from other base stations in the plurality of base stations;
- the RF-based base station having a base station transceiver;
- the telecommunications network having a network transceiver;
- the base station transceiver and the network transceiver being structured for backhaul traffic and signaling for incoming and outgoing mobile calls to the mobile terminal that is operatively coupled to the base station when distance or conditions render the use of wireline-based backhaul impossible; and
- when the mobile terminal roams away from RF-based backhaul cell(s) zone boundaries, the network is structured to detect entry of the mobile terminal into a new zone and to transition a mobile call from an RF-based backhaul to a wire-base backhaul;
- wherein, when the mobile terminal is located in an area where the base station is at a physical distance from the network such that there is no cellular service to the network, the mobile terminal is still able to communicate with the network due to an RF backhaul link between the network transceiver in the network and the base station transceiver in the base station;
- wherein the RF-based base station with the base station transceiver has at least one cell in which is located the mobile terminal, and wherein the RF-based base station, the mobile terminal, and the at least one cell are located at the physical distance from the network such that there is no cellular service to the network.

11. The apparatus according to claim 10, wherein, if the mobile terminal is engaged in a call during transitioning of the mobile call from an RF-based backhaul to a wire-base backhaul, the network is structure to use one of a hard handoff and a soft handoff for the transition.

12. The apparatus according to claim 10, wherein, if the mobile terminal is not engaged in a call, but is powered up, during transitioning of the mobile call from an RF-based backhaul to a wire-base backhaul, the network is structured to use a registration message that is sent to the network by the mobile phone for the transition.

* * * * *